United States Patent [19]

Takase et al.

[11] Patent Number: 4,927,533
[45] Date of Patent: May 22, 1990

[54] WATER DEIONIZING APPARATUS

[75] Inventors: Haruo Takase; Kazushige Uenaka, both of Tokyo; Akira Abe; Yoshihiro Fujita, both of Kanagawa, all of Japan

[73] Assignee: Fuji Photo Film Co., Ltd., Kanagawa, Japan

[21] Appl. No.: 358,289

[22] Filed: May 26, 1989

Related U.S. Application Data

[62] Division of Ser. No. 155,454, Feb. 12, 1988, Pat. No. 4,857,950.

[30] Foreign Application Priority Data

Feb. 13, 1987 [JP] Japan .................................. 62-30782
Feb. 14, 1987 [JP] Japan .................................. 62-32184

[51] Int. Cl.$^5$ .............................................. C02F 1/42
[52] U.S. Cl. .................................... 210/257.1; 210/282
[58] Field of Search ............................. 210/257.1, 282

[56] References Cited

U.S. PATENT DOCUMENTS 4,474,620 10/1984 Hall ...................................... 210/282

*Primary Examiner*—Ivars Cintins
*Attorney, Agent, or Firm*—Sughrue, Mion, Zinn, Macpeak & Seas

[57] ABSTRACT

In photographic processing apparatus for developing, bleaching-fixing and washing photographic materials, a predetermined quantity of fresh wash water is supplied into a washing tank every time a predetermined amount of the photographic materials have been washed. The fresh wash water is provided by deionizing city water and is reservoired in a replenisher tank. In order to detect a predetermined loss of the fresh wash water in the replenisher tank, a conductivity increasing material is dissolved in the fresh wash water in the replenisher tank when a predetermined quantity of the deionized water is supplied so as to electrically connect a pair of electrodes disposed at a predetermined depth of the replenisher tank. A sterilizer is mixed in the fresh wash water to prevent bacterial growth in the replenisher tank. The conductivity increasing material and the sterilizer are prepared as a predetermined dose of mixture necessary and sufficient for the predetermined quantity of deionized water supplied into the replenisher tank.

5 Claims, 5 Drawing Sheets

WATER DEIONIZING APPARATUS

This is a division of application Ser. No. 07/155,454, filed 2/12/88, now U.S. Pat. No. 4,857,950.

BACKGROUND OF THE INVENTION

The present invention relates to a method and apparatus for storing in a reservoir wash water, which is used to wash developed photographic materials and more particularly to a method and apparatus for storing in a reservoir wash water, which makes it possible to prevent biological growth in a reservoir tank and to indicate that the reservoir tank is to be replenished with wash water.

Developing apparatus are usually grouped into two categories: one for photographic prints and the other for photographic films. The two categories differ from one another in the arrangement of their respective processing tanks. For example, in photographic paper developing apparatus, there is provided a developing tank, a bleaching and fixing tank, a plurality of wash water tanks connected with these tanks through pipes. Photographic papers are passed through the developing tank for development, through the bleaching and fixing tank for bleaching-fixing, and then through the wash water tanks, one after another, for washing. Following these processes, the photographic paper is dried and then cut by frame.

In the wash water tank, the wash water washes the bleach-fix solution from the photographic material, such as photographic prints or photographic film. The wash water is contaminated by the bleaching-fixing solution in proportion to the washed amount of photographic materials which have been washed. For this reason, a replenishing wash water tank is installed beside the wash water tank to supply fresh wash water to the wash water tank after every predetermined length of photographic material has passed through the wash water tank.

Presently, it is common in photo-shops to provide so called mini-lab systems for quick and easy development of photographic films and prints. For such a mini-lab system, it is desirable to avoid a pipe arrangement, thereby facilitating installation and maintenance. However, a problem associated with mini-lab systems having no pipe arrangement concerns saving the replenishing wash water as well as the bleach-fix solution. Saving the wash water results in the wash water remaining in the wash water tank and the replenishing wash water tank. As a result the wash water grows moldy and bacterial, thereby forming suspended particles which will stick to the photographic materials.

OBJECT OF THE INVENTION

It is, therefore, an object of the present invention to provide a method and apparatus for storing fresh wash water without any breeding or growth of mold and bacteria even though the fresh wash water remains for a long time in a reservoir tank.

It is another object of the present invention to provide a method and apparatus for storing fresh wash water in the reservoir tank and detecting the quantity of wash water stored in the tank.

SUMMARY OF THE INVENTION

The above and other objects of the present invention are performed by supplying deionized fresh wash water to a replenisher supply tank and adding thereto a predetermined dose of an additive mixture, which enables the detection of the quantity of wash water left in the replenisher tank through the use of electrodes and a sterilizing chemical.

Breeding of mold and/or bacteria in the wash water can be eliminated by deionizing the wash water so as to eliminate metal ions, for example, magnesium ions, calcium ions and so forth, necessary for the mold and bacteria to breed. Any well known deionization method may be used, as long as it reduces the conductivity of water below approximately 80 $\mu$s/cm. For example, the wash water can be deionized either by distillation, by ion exchange resins, or by inverse osmotic membranes.

In deionizing the wash water by distillation, a distillation apparatus is used to evaporate running water in order to generate steam. The steam condenses and collects as wash water by the distillation apparatus.

In using ion exchange resins, water is easily deionized by being run through an ion exchange resin packed column. Water runs through the column at a rate of about 1 to 100 times, desirably about 3 to 30 times, the volume of the ion exchange resin in the column per hour. By making the water run at such a rate, the conductivity of water is deionized under 5 $\mu$s/cm.

As ion exchange resins, there are various well known cation exchange resins (strong acid cation exchange resins, weak acid cation exchange resins) and various anion exchange resins (strong basic anion exchange resins, weak basic anion exchange resins) which are used either separately or in combination. Usually, it is preferred to use a H-group of strong cation exchange resin and an OH-group of weak basic anion exchange resins in combination.

If using a reverse osmotic membrane, a low pressure type RO (reverse osmosis) apparatus may be used by utilizing water at a pressure of 2 to 5 kg/cm. As reverse osmotic membranes used in the RO apparatus, various kinds of membranes can be used, such as those made of cellulose acetate, ethyl cellulose polyacrylic acid, polyacrylonitrile, polyether sulpon or the like. Also the membrane may be one of several types, such as, spiral type, tubular type, hollow fiber type, pleat type, load type, or the like.

It is preferred to deionize water to reduce its conductivity to about 80–5 $\mu$s/cm, desirably under 10 $\mu$s/cm.

Before replenishing the wash water tank with the deionized fresh wash water, it is preferred to sterilize the replenishing wash water by adding a sterilizing agent. As the sterilizing agent, there are various known chemicals such as isothiazoline compounds, triazole derivatives, sulfamide compounds, silver ion releasing compounds, carboxylic acid compounds, active halogen releasing compounds, and the like; more specifically, suitable chemicals include sulfanilamide, benztriazole, 5-chloro-2-methyle-4-isothiazoline-3-one, 2-methyle-4-isothiazoline-3-one, benzthiazoline-3-one, sodium dichloroisocyanurate, orthophenylphenol, sodium dehydroacetate, sodium hypochlorite, and the like.

As the wash water tank or tabks are replenished with wash water from the replenishing wash water reservoir, the quantity of wash water in the replenishing reservoir gradually becomes small, thereby necessitating a supply of fresh wash water into the replenishing reservoir. While supplying fresh wash water into the replenishing wash water reservoir, it is also necessary continuously to replenish the wash water tanks with the fresh wash water from the replenishing reservoir. A level meter, comprising a pair of electrodes, is provided to detect the level of wash water in the replenishing wash water reservoir. The level meter provides a warning when it detects a predetermined wash water level. To enable the electrical detection of the level of the wash water, which is deionized and has decreased conductivity, a chemical tablet is added in the fresh wash water to increase the conductivity of the fresh wash water without increasing metal ions suitable for breeding bacteria. Due to this additive, the fresh wash water increases in conductivity to approximately 100–300 $\mu$s/cm. As long as the conductivity of the wash water is within these values, it is possible to electrically detect the water level without causing a problem of metal ions depositing on the photographic materials and on the electrodes. Examples of suitable conductivity increasing agent are: sodium sulfate chloride, potassium sulfate, or the like.

For convenience of adding the chemical agent into the replenishing wash water reservoir, the conductivity increasing agent and the sterilizing agent are mixed and provided as either a solid tablet or a capsule having a dose necessary for a predetermined quantity of deionized fresh wash water. It is to be noted that a proper tablet forming pressure should be applied when making such a tablet. Taking sodium sulfuric anhydride for example, if the tablet is formed with an application of forming pressure under about 20 kg/cm, it will be hard to maintain it without distortion of its shape. On the other hand, if formed over 100 kg/cm, it will be hard to dissolve with ease in wash water. Therefore, it is preferred to form the tablet with an application of forming pressure between 20 and 100 kg/cm, in particular 20 and 80 kg/cm. To facilitate dissolution of the tablet in wash water, it is effective to add to the tablet a foam material such as organic acid (tataric acid, citric acid) mixed with sodium carbonate or sodium hydrogencarbonate. It is suitable for the tablet to contain organic acid and sodium carbonate or sodium hydrogencarbonate, each of about 10 to 30% of the whole weight of the tablet, in order to foam with enough result. If containing the additive in a capsule, it is preferred to use polyvinyl alcohol for the capsule.

BRIEF DESCRIPTION OF THE DRAWINGS

The above described and other objects of the present invention will become apparent from the following description taken in conjunction with preferred embodiments thereof with reference to the accompanying drawings in which.

DETAILED DESCRIPTION OF THE INVENTION

Figure 1:
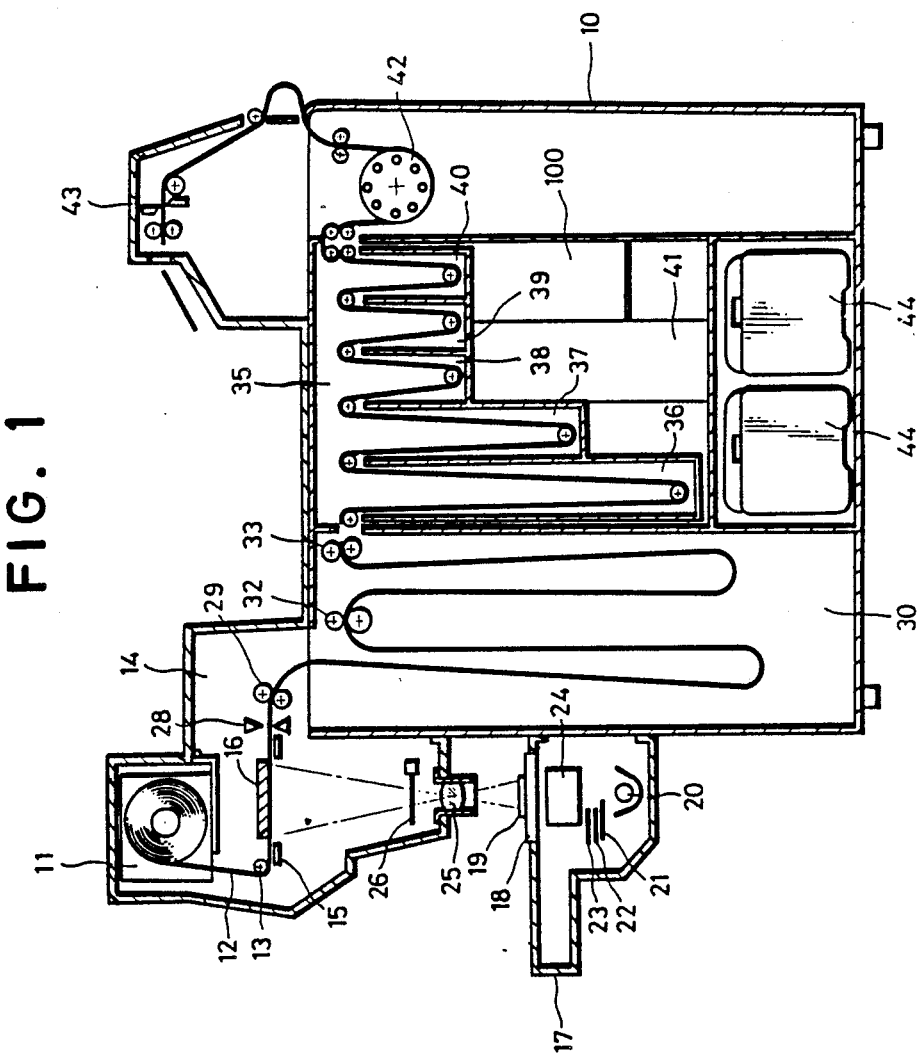
FIG. 1 is a schematic cross sectional view showing a printer-processor embodying the present invention.

Referring now to FIG. 1 shown therein is a color printer-processor in which the present invention is embodied. The printer-processor 10 has removably mounted on its top thereof, a paper magazine 11 having a roll of a color photographic paper 12 therein. The color photographic paper 12 is withdrawn an amount corresponding to one frame by means of a roller 13 and placed in position between an exposure mask 15 and a pressure plate 16 disposed in an exposure chamber 14.

Under the exposure chamber 14 there is a table 17 on which a negative carrier 18 is disposed to hold a color negative 19. An illumination lamp 20 is provided under the negative carrier 18 to illuminate the color negative 19 via three color filters 21, 22 and 23 for cyan, magenta and yellow. As is well known in the art, by passing the light from the lamp 20 through the filters 21, 22 and 23, three color components of light can be desirably adjusted to provide proper printing light. The component adjusted printing light passes a mirror box 24 to be uniformly mixed and illuminates the color negative 19 from its back side. The color photographic paper 12 is exposed to the light passing through color negative 19 through a printing lens 25 and a shutter 26.

On the right side (as viewed in FIG. 1) of the exposure mask 15 there is a cutter 28 for cutting the exposed part of the color photographic paper 12 to a predetermined length at a desired time. A pair of rollers 29 transport the exposed color photographic paper into a keeping chamber 30 wherein the exposed color photographic paper 12 is kept for a while in the form of a loop. In the keeping chamber 30 there are two pairs of rollers 32 and 33 for suspending the exposed color photographic paper 12 in a double loop.

Adjacent the keeping chamber 30 is a processing chamber 35 wherein the exposed color photographic paper 12 is processed. In the processing chamber 35 there are various processing tanks, namely a color developing tank 36, a bleaching-fixing tank 37, three consecutive wash tanks 38 to 40, a replenisher tank 41 wherein replenishing wash water is contained, and a water purifying tank 100. The exposed color photographic paper 12 is passed through these processing tanks 36 to 40 in order to be subjected to color developing, bleaching-fixing and washing. In a space provided under the processing chamber 35, two waste solution reservoir tanks 44 are disposed to receive waste solutions from the processing tanks 36 to 40.

After the processing chamber 35, a dryer drum 42 is provided for drying the processed color photographic paper 12. On the processing chamber 35 there is a cutter unit 43 mounted on the top of the printer-processor 10. The cutter unit 43 separates the processed and dried color photographic paper 12 into individual frames to provide individual color prints.

Figure 2:
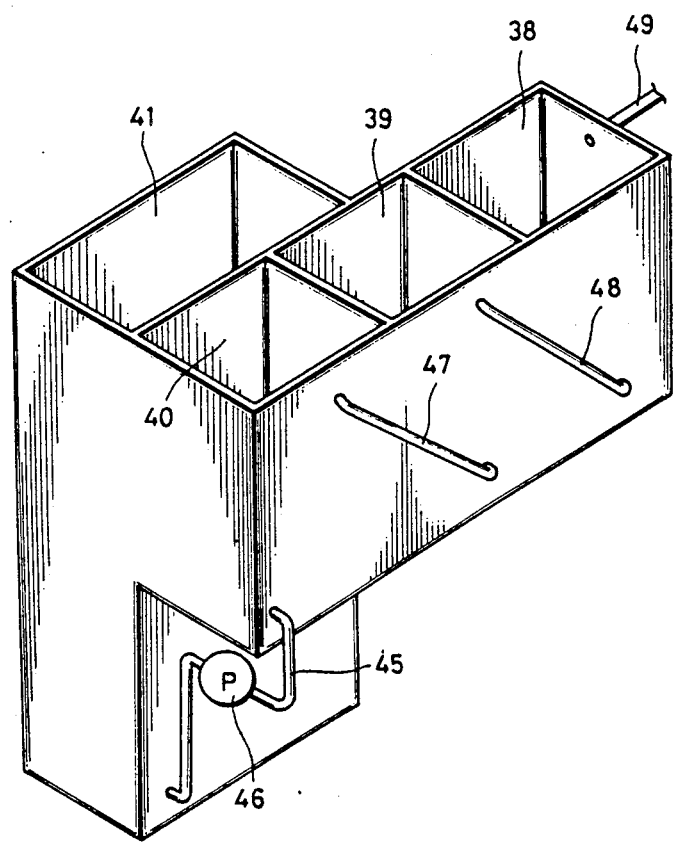
FIG. 2 is a perspective view of a replenishing wash water supply tank and wash water tanks of the printer-processor of FIG. 1.

Referring now to FIG. 2, there is shown the wash tanks 38 to 40 disposed side by side and the replenisher tank 41, all tanks being combined as one unit. The replenisher tank 41 communicates with the lowermost wash tank 40 through a pipe 45 so as to replenish the lowermost wash tank 40 with fresh wash water. A pump 46 is connected in the pipe 45 to send fresh wash water up the lowermost wash tank 40. The lowermost wash tank 40 communicates with the middle wash tank 39 through a pipe 47. When the wash water in the tank 40 exceeds a predetermined level it will flow out via pipe 47 to tank 39. The middle wash tank 39 communicates with the uppermost with tank 38 through a pipe 48, so as to send wash water exceeding a predetermined level to the uppermost with tank 38. On one side wall of the uppermost wash tank 38, there is an overflow pipe 49 connected to conduct overflow wash water in the uppermost wash tank 38 as waste to the waste solution reservoir tank 44.

Figure 3:
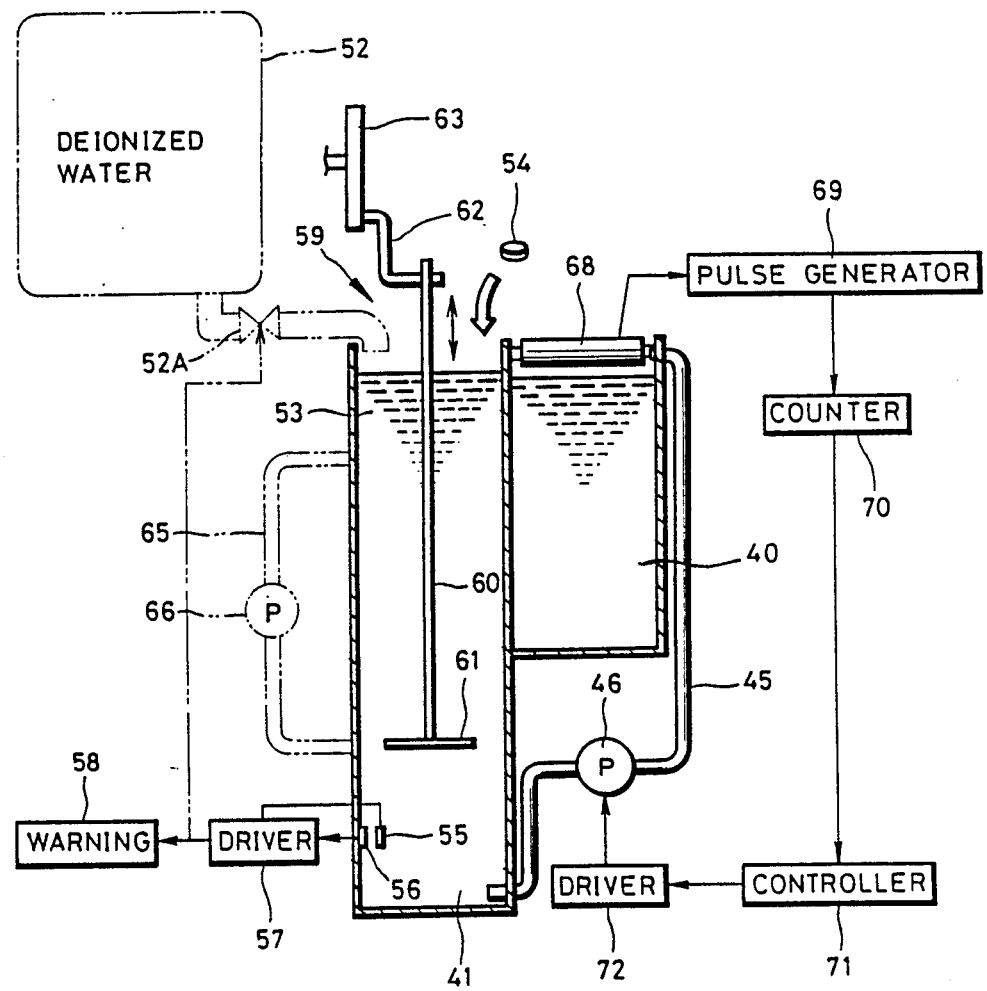
FIG. 3 is a explanatory view for showing the reservoiring method of the present invention.

A preferred example of a replenisher tank 41 and wash tanks 38 to 40 is illustrated in FIG. 3. A reservoir tank 52 contains a predetermined quantity, for example 10 liters, of deionized purified water. The deionized purified water, having a conductivity reduced from 350 $\mu$s/cm to 5 $\mu$s/cm is provided by a water purifying apparatus 100 as described in detail later. This deionized purified water is supplied as fresh wash water to the replenisher tank 41 to make up the loss of the replenishing wash water 53 in the replenisher tank 41. Following the supply of the deionized purified water to the replenisher tank 41, a tablet 54 functioning as a conductivity increasing agent and a sterilizer is thrown in the replenisher tank 41. The tablet 54 has a large enough dose to increase the conductivity of the wash water in the replenisher tank 41 to between 100 and 300 $\mu$s/cm and to sterilize the wash water in the replenisher tank 41. The tablet is a mixture of 1.3 g of sodium sulfuric anhydride and 0.2 g of sodium dichloroisocyanurate.

Inside the replenisher tank 41 is a pair of electrodes 55 and 56 separated horizontally by an appropriate distance and electrically connected through the wash water 53. A driver 57, connected between a warning device 58 and the electrode 56, detects when the level of the water 53 drops below electrodes 55, 56, thereby breaking the interconnection between the electrodes. The driver then drives warning device 58 which provides an alarm or the like, indicating that the replenisher tank 41 is to be replenished with a certain amount of deionized purified wash water. In consideration of the time required to fill tank 41, it is preferable to place the electrodes 55 and 56 at a depth of one tenth of the tank 41. Alternative to or in addition to providing a warning, the driver 57 may open a solenoid valve 52A disposed in a supply pipe 52C of the reservoir tank 52.

In order to dissolve and mix the tablet 54 in the water 53 there is provided a stirrer 59 having a stirring blade 61 attached to the lower end of a stem 60 which is connected to a crank 62 of a rotary plate 63. When the rotary plate 63 turns, the stirring blade 61 is pushed up and down thereby stirring the water 53 to dissolve the tablet 54 and mix it with the wash water 53. As an alternative to the stirrer 59, the wash water 53 may be circulated through a pipe 65 connecting the top and bottom of tank 41 by means of a pump 66 connected to the pipe 65.

In the wash tank 40 there are a number of rollers for conveying the exposed color photographic paper 12. Any one of which, for example roller 68, is connected to a pulse generator 69 to provide a pulse counter 70 with a single pulse every predetermined angular amount of revolution of the roller 68. When counter 70 counts a predetermined number of pulses, it provides a signal to a controller 71 which actuates a driver 72 so as to cause the pump 46 to begin operating. As a result, the fresh wash water 53 in the replenisher tank 41 is supplied to the wash tank 40. For example, assuming the color photographic paper 12 has a width of 82.5 mm, pump 46 supplies 30 ml of the fresh wash water 53 to wash tank 40 for each one meter of the color photographic paper 12. In the case of film processing, 30 ml of the fresh wash water 53 is supplied per one roll of 35 mm-size color film with 24 exposures.

Figure 4:
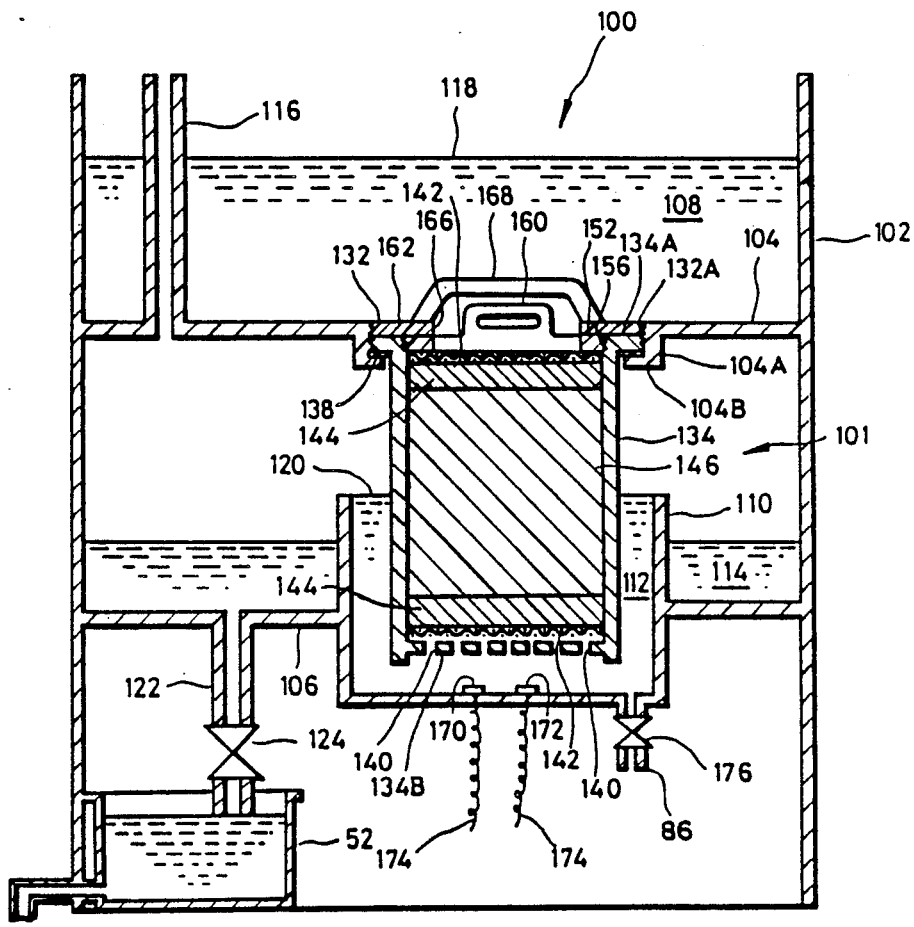
FIG. 4 is a cross sectional view of a water deionizing apparatus.
Figure 5:
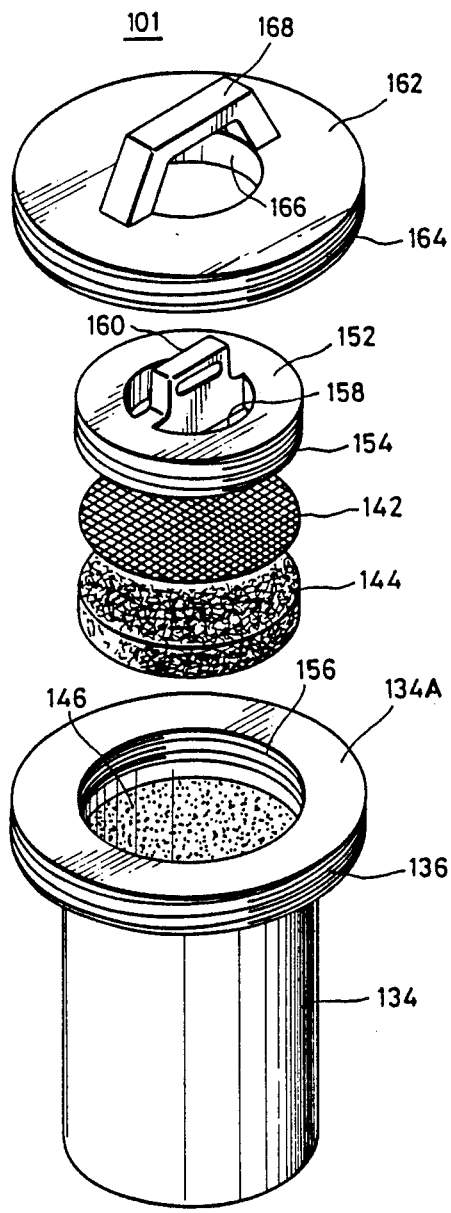
FIG. 5 is an exploded perspective view of a water deionizing unit of the water deionizing apparatus of FIG. 4.

Reference is now made to FIGS. 4 and 5 showing the water purifying apparatus 100. The water purifying apparatus 100 has a housing 102 with upper and lower partition walls 104 and 106 stretched across the inside of the housing 102, so as to provide an upper reservoir 108 for water, such as city water, and a supplementary reservoir 114 for purified water. At the middle of the lower partition wall 106 a generally box-shaped inner housing 110 with its top opened is formed to provide a lower reservoir 112. As is apparent from FIG. 4, the bottom of the inner housing 110 is below the level of the lower partition wall 106.

The lower and supplementary reservoirs 112 and 114 communicate with the atmosphere by means of an air relief pipe 116 extending from the upper partition wall 104 to the top of the housing 102.

Connected to the supplementary reservoir 114 is a drain pipe 122 with a valve 124 through which the purified water 30 in the supplementary reservoir 114 is discharged into the reservoir 52 previously described and shown in FIG. 3. On the other hand, connected to the inner housing 110 is a drain pipe 86 with a valve 176 for discharging the purified water in the lower reservoir 112 when the lower reservoir 112 is in need of cleaning.

In the upper partition wall 104 there is formed an opening 132 which is formed with inner peripheral threads 132A and surrounded by a cylindrical wall 104A with a L-shaped flange 104B for receiving therein a water purifying unit 101 shown in FIG. 5. The water purifying unit 101 is generally shaped in the form of a cylindrical barrel 134 with an upper flange 134A having outer peripheral threads 136. By mounting the flange 134A on the flange 104B through an annular packing 138, the water purifying unit 101 is firmly seated in the opening 132 of the upper partition wall 104.

As shown in detail in FIGS. 4 and 5, the water purifying unit 101 comprises the cylindrical barrel 134 having a bottom wall 134B formed with a number of small openings 140, an ion exchange resin in the form of a cylindrical block 146 received in the cylindrical barrel 134, and a lid 152. Between the ion exchange resin block 146 and the bottom wall 134B, and between the lid 152 and block 146 there are a net 142 and plastic wool mat 144. The lid 152 is formed with outer peripheral threads 154 engageable with inner peripheral threads 156 formed in an inner periphery of the cylindrical barrel 134. The lid 152 is also formed with through openings 158 on both sides of a grip 160. When fastening the lid 152, the ion exchange resin block 146 is pressed between the plastic wool mats 144 so that it will not move within the cylindrical barrel 134.

A holding cover 162 is provided for firmly holding down the water purifying unit 101 in the opening 132. The holding cover 162 is formed with outer peripheral threads 164 and is fastened in the opening 132 through the inner periphery threads 132A of the opening 132. In the holding cover 162 a through opening 166 is formed to allow water to enter into the water purifying unit through the openings 158 of the lid 152. Designated at 168 is a grip provided for easy handling.

At the bottom of the inner housing 110, there is a pair of electrodes 170 and 172 connected to a controller (not shown) through wires 174. The pair of electrodes 170 and 172 is electrically disconnected as long as the ion exchange resin 146 performs its intended ion exchanging function. However, if the ion exchange resin 146 fails to perform the intended function, the water processed through the water purifying unit 110 will have an increased conductivity, for example, 50 $\mu$s/cm, providing an electrical connection between electrodes 170 and 172, thereby causing the controller to provide a warning which indicates a need either to replace the existing ion exchange resin 146 or the existing water purifying unit 110.

It will be noted that the water purifying unit 101 is disposed so that its entrance and exit are emersed in reservoirs 108 and 112, respectively. As a result air bubbles, which could adversely affect the ion exchange resin 146, will not enter the water purifying unit 110.

In order to purify water, water 118, for example city water, is continuously flooded into the upper reservoir 108. The water 118 enters into the water purifying unit 134 through the through openings 166 and 158 of the holding cover 162 and the lid 152 in order. In the water purifying unit 134, the water permeates through the ion exchange resin block 146 and is deionized, being softened. The deionized and softened water flows out through the small openings 140 and is collected as purified fresh wash water 120 in the lower reservoir 112. As the amount of purified water increases, it flows out from the lower reservoir 110 into the supplementary reservoir 114. At any desired time, by opening the valve 124, the purified fresh wash water 120 is supplied to reservoir 52, and from there, via valve 52A (FIG. 3) to the replenisher tank 41 of the printer processor 10.

The printer processor 10 thus constructed is operated as follows. By operating a print start key (not shown), the color filters 21 to 23 are inserted into the printing path to control the printing light according to the color negative film 19 and, thereafter, the shutter is opened for a certain time to expose the color photographic paper 12 placed in the exposure mask 15 so as to form a latent image of the color negative film 19 on the color photographic paper 12. The exposed color photographic paper 12 is moved forward one frame at a time. In a well known manner, the color photographic paper 12 is withdrawn from a roll so as to be exposed to the next frame of the color negative film 19.

As the exposure is repeated, the exposed color photographic paper 12 is forwarded frame by frame and temporarily stored in the paper keeping chamber 30 in the form of a loop. When a predetermined number of exposures have been effected, the exposed part of the color photographic paper 12 is cut at the trailing end by the cutter 28. The strip of the exposed color photographic paper 12 is then conveyed through the processing chamber 35 so as to be continuously passed through the developing tank 37, the bleaching-fixing tank, and the three washing tanks 38 to 40. Thereafter, the processed color photographic paper 12 is forwarded to and dried by the drying drum 42. Then, the processed color photographic paper 12 is cut by the cutter unit 43 to provide color prints.

During the washing of the exposed color photographic papers 12, the wash water in each wash tank 38, 39, 40 becomes contaminated with bleach-fix solution, sticks to the color photographic paper 12, and results in a lower washing efficiency. The pump 46 is actuated to supply fresh wash water from the replenisher tank 41 to the lowermost wash tank 40 when a predetermined number of strips of the exposed color photographic papers 12 are passed and washed through the respective wash tanks 38 to 40. The same quantity of wash water as that supplied from the replenisher tank 41 flows from tank to tank, namely into the middle wash tank 39 from the lowermost wash tank 40 and into the uppermost wash tank 38 from the middle wash tank 39. From the uppermost wash tank 38, the same quantity of wash water is discharged into the waste tank 44 through the overflow pipe 49.

When the pair of electrodes 55 and 56 detects a predetermined lower level of fresh wash water in the replenisher tank 41 by being electrically disconnected, the driver 57 is actuated to provide a warning sound or signal through the warning device 58. Following the warning, a predetermined quantity of the deionized purified water in the reservoir tank 52 is either manually or automatically supplied into the replenisher tank 41. Then a chemical tablet 54 is thrown into the replenisher tank 41; the stirrer 59 is actuated to stir the washer 53 for a while, so as to dissolve and mix the chemical tablet 54.

As a result of practically operating the printer-processor shown in FIG. 3 for three weeks, eight hours every day, to process 30 m of 82.5 mm size color photographic paper and replenishing the washing tank with 30 ml of the fresh water per one meter of the color photographic paper, no suspended articles were formed in the replenisher tank 41 and there was no stain found on the processed color photographic paper.

What is claimed is:

1. A water deionizing apparatus for deionizing and purifying water comprising:
   a first chamber for storing water therein having an opening in a bottom portion thereof;
   a second chamber for storing deionized water therein;
   a water deionizing unit removably disposed in said opening between said first and second chamber through which said water is deionized and purified, said deionizing unit having its water entrance sunk in said water in said first chamber and its deionized water exit sunk in said deionized water in said second chamber; and
   a removable holding cover for holding down said deionizing unit in said opening, said holding cover having a through opening therein to allow water to enter said water entrance of said deionizing unit.

2. A water deionizing apparatus as defined in claim 1, wherein said second chamber is open at an upper portion and is surrounded by a reservoir for storing said deionized water overflowing said second chamber.

3. A water deionizing apparatus as defined in claim 1, wherein said water deionizing unit includes an ion exchange resin.

4. A water deionizing apparatus as defined in claim 1, wherein said water deionizing unit comprises a cylindrical barrel having a bottom wall formed with a plurality of small openings which serve as said deionized water exit.

5. A water deionizing apparatus as defined in claim 4, wherein said water deionizing unit includes a lid engageable with said cylindrical barrel and having openings passing therethrough.

* * * * *